June 14, 1960 D. D. NAGEL 2,940,725
BALL VALVE
Filed June 20, 1958
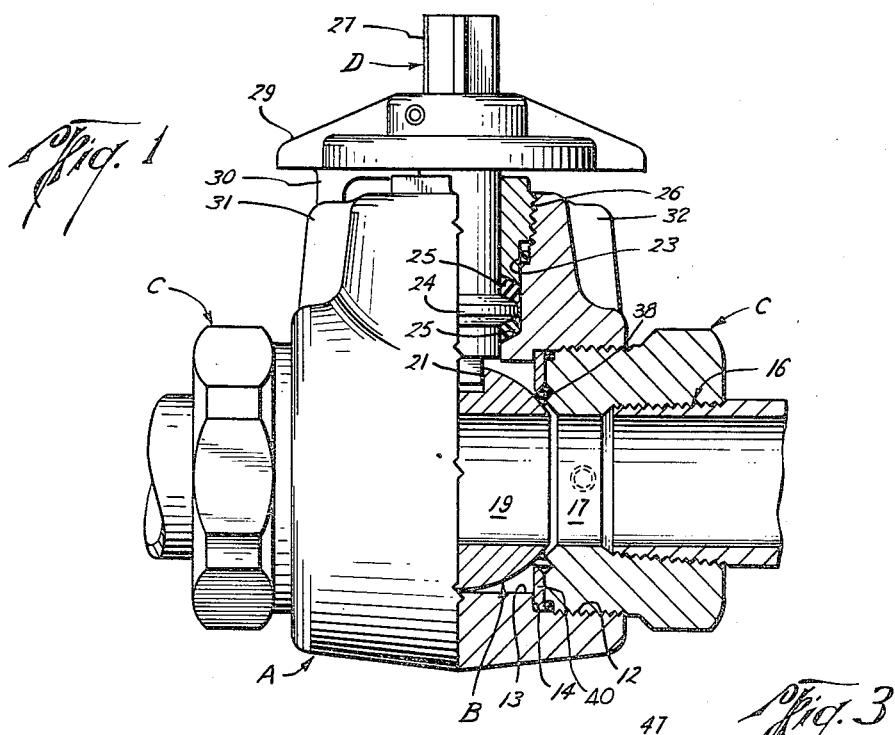
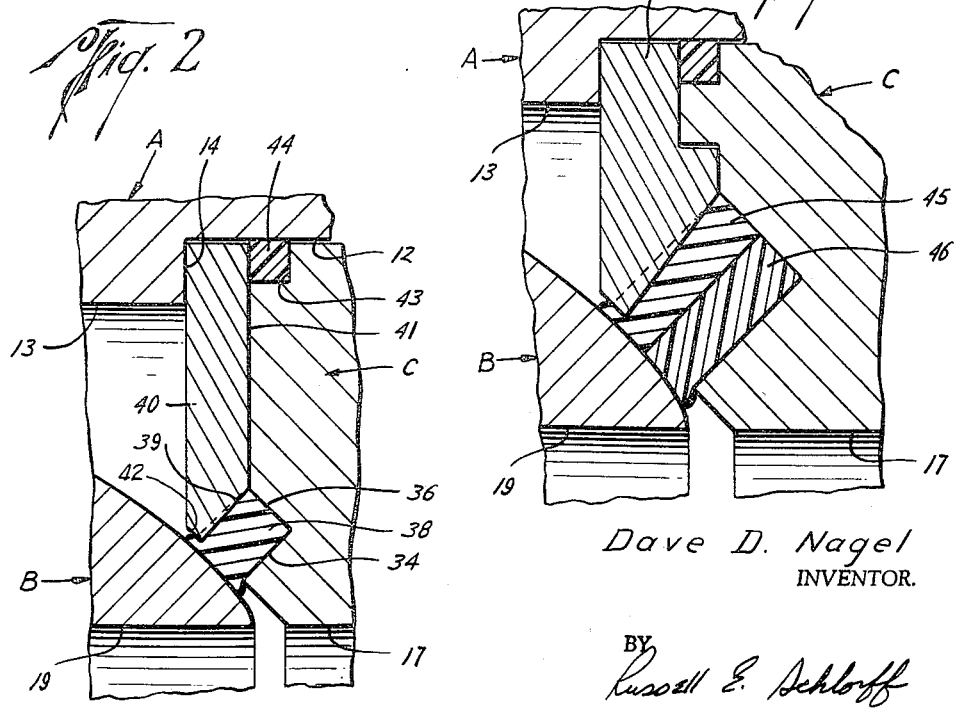
Dave D. Nagel
INVENTOR.
BY Russell E. Schlorff
ATTORNEY United States Patent Office 2,940,725
Patented June 14, 1960

2,940,725

BALL VALVE

Dave D. Nagel, Houston, Tex., assignor to ACF Industries, Incorporated, New York, N.Y., a corporation of New Jersey Filed June 20, 1958, Ser. No. 743,314

2 Claims. (Cl. 251—317)

This invention relates to spherical plug valves having a sealing member formed of a substantially inert material.

This invention is in some respects an improvement over Robert Clade's United States Patent 2,762,601, dated September 11, 1956, and Robert Clade's United States Patent 2,861,773, dated November 25, 1958.

Spherical plug valves or "ball valves," as they are commonly known, constructed in accordance with the disclosure of the above patents, are being successfully commercially manufactured and used. However, in seeking to extend the use of such valves to other services, develop valves of larger sizes and higher pressure ratings, it was found that the inert plastic seal would not in all cases provide an effective upstream seal and that as the size or pressure rating of the valves increased, the downstream seal in some cases did not function properly.

In valves manufactured in accordance with the above-identified patents, the valve member or ball is suspended between the two plastic sealing members. Behind or adjacent to each seal member there is a cavity into which it is possible for the plastic seal member to flow. In the valve closed position, the ball is free to float, and consequently, pressure in the line causes the ball to move toward the downstream seal and apply a load on the downstream seal. The load on the seal is increased as the size of the valve or the pressure of the lading in the valve increases.

In designing valves of larger sizes and higher pressure ratings, the size of the seal was increased in order to compensate for the higher load on the seal and thereby maintain a consistent unit load on the seal. However, it was found in the case of a larger diameter ball, that even though the unit load remained consistent with the unit load on the seals of smaller valves, that the seal moved into the cavity and that the seal projecting past the secured portion acted as a wiper as the valve was operated. As a result, there was a marked increase in ball movement. Such movement of plastic material into the cavity substantially reduced the effective length of the seal and permitted the ball to move downstream a sufficient amount so that it would lose contact with the upstream seal. Therefore, while a downstream seal can be maintained upon increased load upon the seal (increased ball size or increased pressure), an upstream seal will no longer be present. With a seal member formed of polymerized tetrafluoroethylene, commercially available under the trademark "Teflon," it was found that upon an increase in temperature (particularly above 300° F.) the Teflon would change physical characteristics and flow more easily. Therefore, if there is a cavity behind the seal member, it is possible for pressure to enter such cavity and push out the plastic seal member. While at low pressures the retention of the plastic seal may not be material consideration, it was found that under certain conditions that in valves operating under higher pressure the seal may be blown out of its pocket.

In the present invention, the plastic seal member is completely confined, the unsupported length reduced, and subjected to angular interference sufficient to positively retain the seal in position. By confining the plastic seal member, there is no cavity into which it can move and therefore the effective length of such seal will not be so reduced upon application of pressure as to permit the ball to move sufficiently to lose contact with the upstream seal. Accordingly, the valve can be used for such services as block and bleed where the maintenance of an upstream seal is of paramount importance. By having a reduced length of unsupported plastic material, wiper action is substantially reduced, and by having a shorter section subject to pressure, it is possible to exert a greater load with a smaller amount of deformation. By setting up in angular interference of sufficient magnitude to positively restrain the seal, the seal will be effectively maintained in position, so that an extrusion of the seal will have to occur before there is a complete or partial removal of the seal.

It is the primary object to provide an improved spherical plug valve having sealing members formed of inert materials.

It is another object to provide a spherical plug valve having plastic sealing members where such members are fully confined, supported and restrained.

It is a further object to provide a spherical plug valve having plastic sealing members in which movement of the spherical plug toward the downstream side is maintained at a minimum.

It is still a further object to provide a spherical plug valve having plastic sealing members which can be utilized for block and bleed service.

It is still a further object to provide an improved spherical plug valve having plastic sealing members in which an initial interference is set up in such sealing member whereby the sealing member will be completely restrained.

The above and other further objects and features of the invention will be obvious upon understanding of the illustrative embodiments about to be described, or will be indicated in the appended claims, and various advantages not referred to herein will occur to one skilled in the art upon employment of the invention in practice.

Preferred embodiments of the inventions have been chosen for purposes of illustration and description and are shown in the accompanying drawings, forming a part of the specification wherein:

Fig. 1 is a front elevation of a valve incorporating the present invention, one half of the valve being in section.

Fig. 2 is an enlarged detail of the sealing arrangement shown in Fig. 1.

Fig. 3 is an enlarged sectional view similar to Fig. 2 but showing a slight variation of sealing arrangement.

Referring now to the drawings in detail, it will be seen that the valve consists of a general tubular body A having a body flow passage within which is rotatably mounted a spherical plug B held in position centrally of the body by closure fittings C—C. Rotation of the plug B is controlled by a stem D which extends outwardly of the body.

The valve body A is provided with a longitudinal bore or body flow passage. The ends 12, 12 of the bore are of a slightly larger diameter than the central portion 13, and the juncture of each end 12, with the central portion 13 forms shoulders 14, 14. Each outer portion 12 is provided with threads to receive the fitting C which is axially movable towards the center of the body. If desired, the threaded connection between the body and fitting may be eliminated and the end of the fitting telescoped into the end of the body and then detachably secured to the body. The outer end 16 of each fitting is provided with a female thread adapted to mate with a male connection; however, the end of the fitting may be provided with any other type of end connection well known in the valve art in order that the valve may be connected to a flow system. Each fitting C is provided with a flow passage 17 which is in axial alignment with the bore.

The spherical plug B is located in the central portion of the bore and is the valving member of the valve. The plug B has a passage 19 registerable with the passages 17, 17 of the fittings to permit flow in the open position. In order to receive the stem D, the plug has a transverse key way slot 21 which is milled across the top of the plug B. The slot 21 receives the end of the stem D and rotation of the stem moves the passage 17 of the plug into and out of registry with the passages 17, 17. The stem D projects upwardly out of the valve body through a counterbore 23 in a boss on the top of the body. The stem D is provided with a shoulder 24 having tapered bearing surfaces, and packing rings 25, 25 are placed on each side of the shoulder 24. The stem assembly is secured in position by a gland nut 26, which is threadingly engaged in the outer end of the bore 23. The gland nut 26 compresses the packing rings 25, 25 between itself, the tapered surfaces of the shoulder 24 and the bottom of the counterbore 23 thereby preventing leakage. The outer end 27 of the stem D may be provided with flats to receive a wrench for turning the stem. A stop ring 29 is secured to the outer end of the stem, the stop ring 29 is provided with a projection 30 which contacts either projection 31 or 32 formed on the valve body A to limit the movement of the plug B.

The end of each closure fitting C facing the spherical plug B is machined to provide a flat surface 41 adjacent the outer circumference of the fitting C which is normal to the axis of the flow passage 17. A conical surface 36 converging toward the outer end 16 of the fitting C intersects the flat surface 41. A second conical surface 34 is normal to and intersects the first conical surface 36. These conical surfaces 34 and 36 form a V-shaped groove in the end of the closure fitting C for the purpose of receiving and supporting the seating and sealing means 38 for the spherical plug B.

In the above respects, the valve is similar to that disclosed in the above-mentioned co-pending Clade application, Serial Number 475,330. The present invention relates to the construction of the sealing means and method of retaining such means as will be now fully described.

The seating and sealing member 38 is formed from a flat ring of plastic which may be polymerized tetrafluoroethylene; if desired, other suitable plastic may be used to form the sealing member. The flat ring is deformed angularly to lie against the conical surface 34 of the fitting C. The opposite face of the sealing ring 38 is opposed by the conical face 39 of the retaining ring 40 which is clamped between the shoulder 14 and the inner end wall 41 of the closure fitting C. The member 38 is so designed that upon seating of the plug in initial assembly, by movement of the fittings toward the plug B, the outer circumferential wall of the member 38 will be tight against the surface 36 and the member 38 will be in compression between the surface 36 and plug B. The amount of initial interference between the seal 38 and plug B may differ for various sizes of valves since the essential design criteria is to maintain a constant unit load on the seal. As can be seen in Fig. 2, there will be a slight amount of cold flowing of the seal upon assembly of the valve. This results from loading the seal to obtain proper compression of the seal, such cold flowing is not deleterious.

As the seal 38 is being compressed due to the inward movement of its closure fitting C, it is fully encompassed in the cavity formed by the conical surface 34, the conical surface 36 and the conical surface 39 of the retaining ring 40. The conical surface 39 is so designed that it will bite into the face of the seal 38 commencing at the juncture of the surface 41 and surface 36 and progressively increasing toward the plug B. Such biting into the seal completely contains the seal in its cavity and therefore the seal will not be blown out when a portion of the seal is unsupported during opening of the valve. If desired, the end of retaining ring 40 may be relieved so as to form a surface 42 aligned with the conical surface of the fitting around the passage 17.

As can be clearly seen in Fig. 2, the sealing means 38 is confined within the cavity formed by the V-shaped groove and the retaining ring except for a short section which projects beyond such cavity and contacts the spherical plug B. By so confining the seal, the plastic material forming the seal is trapped and cannot flow upon application of pressure; therefore, the ball will not be able to float downstream sufficiently to lose contact with the upstream seal. As a result, the valve will seal both upstream and downstream and the valve can be used for block and bleed service where such an upstream seal is required. By maintaining the length of unsupported seal at a minimum, wiper action of the seal is eliminated. The elimination of wiper action cuts down on ball movement. The short section can also support a greater load before deformation than is possible with a larger section. The angular interference between the retaining ring and seal restrains the seal from moving out of the cavity.

In order to eliminate cutting of the seal 38 when the valve is operated and the port of the plug crosses the seal, the juncture of the port and spherical surface is rounded. Such construction permits the leading edge of the port of the plug to pass over the seal without the edge of the plug damaging the surface of the seal. In order to prevent leakage around the fitting C, the end 41 of the fitting C is provided with a circumferential notch 43 in which is placed a gasket 44.

Fig. 3 shows a slightly modified form of seating and sealing means and retaining ring. In such form, the seating and sealing means is divided into two separate members 45 and 46 and the retaining ring 47 has a cross sectional area similar to a J. There is similar compression and restraint of the members 45 and 46 as was the case of single member 38.

The invention provides a spherical plug having plastic seating and sealing means in which the seating and sealing means is completely confined and restrained. The confinement results in stabilizing of the floating plug and enables the retention of an upstream seal at all times. The restraint entraps the plastic sealing means and prevents it from being dislocated.

As various changes may be made in the form, construction and arrangements of the parts herein without departing from the spirit and scope of the invention and without sacrificing any of its advantages, it is to be understood that all matter herein is to be interpreted as illustrative and not in a limiting sense.

I claim:

1. In a spherical plug valve the combination of a valve body, a body flow passage extending through the body, the outer ends of said passage being of a larger diameter than the center portion whereby shoulders are formed at such junctures, a spherical plug rotatably mounted in the central portion of said passage, closure means partially closing the ends of said passage, the closure means and plug having passages which are aligned in valve open position and which are disconnected on rotation of the plug, the end of each closure means facing the plug being formed with a flat surface normal to the axis of the flow passage, a conical surface converging toward the outer end of the fitting intersecting said flat surface and a second conical surface normal to and intersecting the first conical surface, said conical surfaces forming a V-shaped groove, plastic sealing means, and retaining means, the retaining means formed of a flat annular ring which is engaged about its outer circumferential edge by the shoulder and flat end of the closure means, the face of the inner circumferential edge of the ring adjacent the closure means being angularly formed, each sealing member formed of an initially flat annular ring angularly flexed to conform to the second conical surface, one side of said sealing ring positioned on said second conical surface, the outer circumferential surface of said ring adjacent the converging conical surface, the inner circumferential surface engaging the spherical plug, the other face of said ring being restrained by the angular face of the retaining means which bites into said sealing ring commencing at the juncture of the flat surface and converging conical surface and progressively increasing toward the spherical plug.

2. In a spherical plug valve the combination of a valve body, a body flow passage extending through the body, the outer ends of said passage being of a larger diameter than the center portion whereby shoulders are formed at such junctures, a spherical plug rotatably mounted in the central portion of said passage, closure means partially closing the ends of said passage, the closure means and plug having passages which are aligned in valve open position and which are disconnected on rotation of the plug, the end of each closure means facing the plug being formed with a flat surface normal to the axis of the flow passage, a conical surface converging toward the outer end of the fitting intersecting said flat surface and a second conical surface normal to and intersecting the first conical surface, said conical surfaces forming a V-shaped groove, plastic sealing means, and retaining means, the retaining means formed of an annular ring, the outer circumferential edge of which is engaged by the shoulder and flat end of the closure means, each sealing member being formed to conform to the second conical surface, one side of said sealing ring positioned on said second conical surface, the outer circumferential surface of said ring adjacent the converging conical surface, the inner circumferential surface engaging the spherical plug, the other face of said ring being restrained by the retaining means which bites into said sealing ring commencing near the juncture of the flat surface and converging conical surface and progressively increasing toward the spherical plug.

References Cited in the file of this patent

UNITED STATES PATENTS

| | | |
|---|---|---|
| 2,741,138 | Russell | Apr. 10, 1956 |
| 2,845,247 | Housekeeper | July 29, 1958 |